March 22, 1960     W. STELZER     2,929,216
BOOSTER BRAKE MECHANISM
Filed Nov. 27, 1957     3 Sheets-Sheet 1
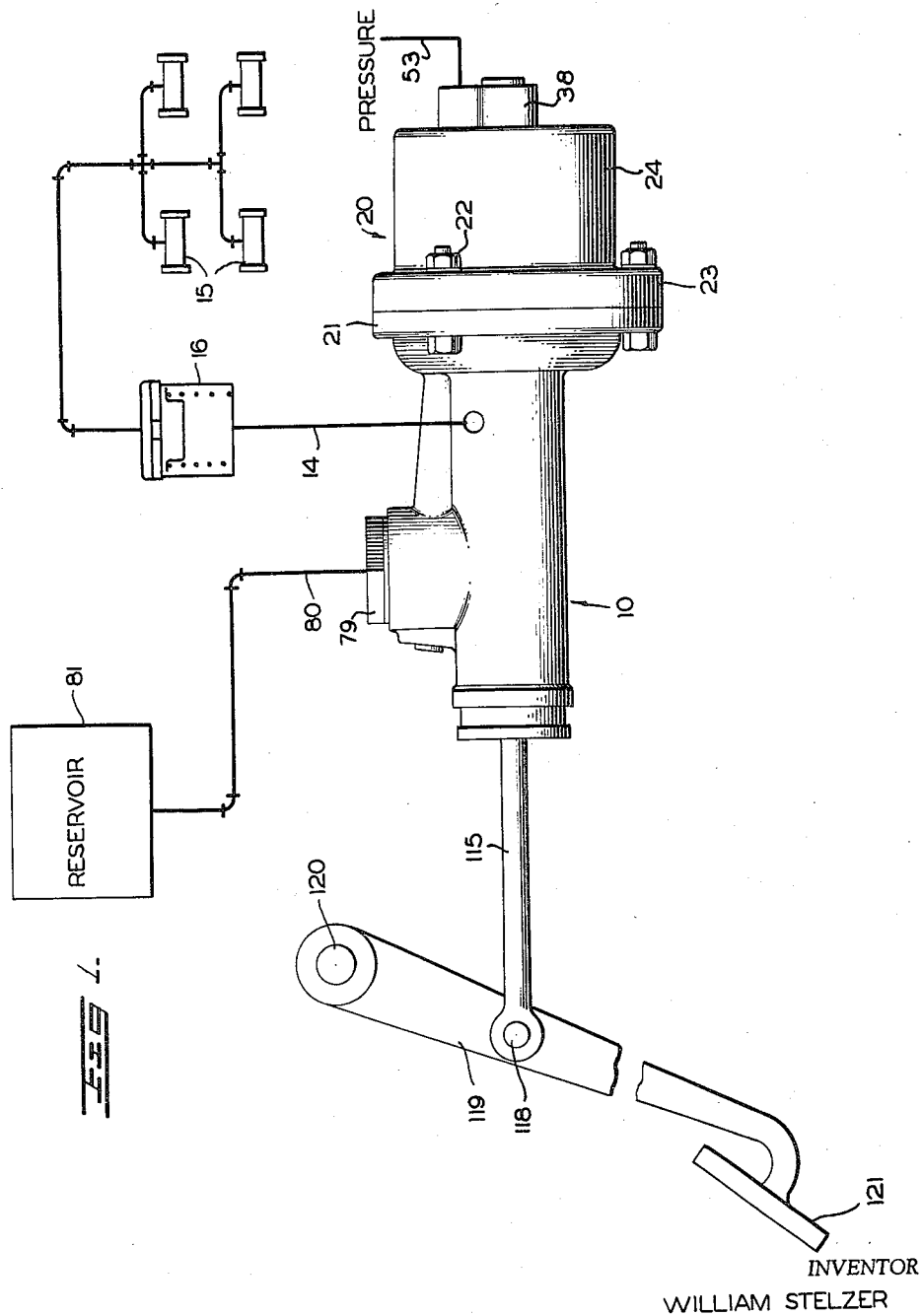
INVENTOR
WILLIAM STELZER
BY *John F. Phillips*
ATTORNEY

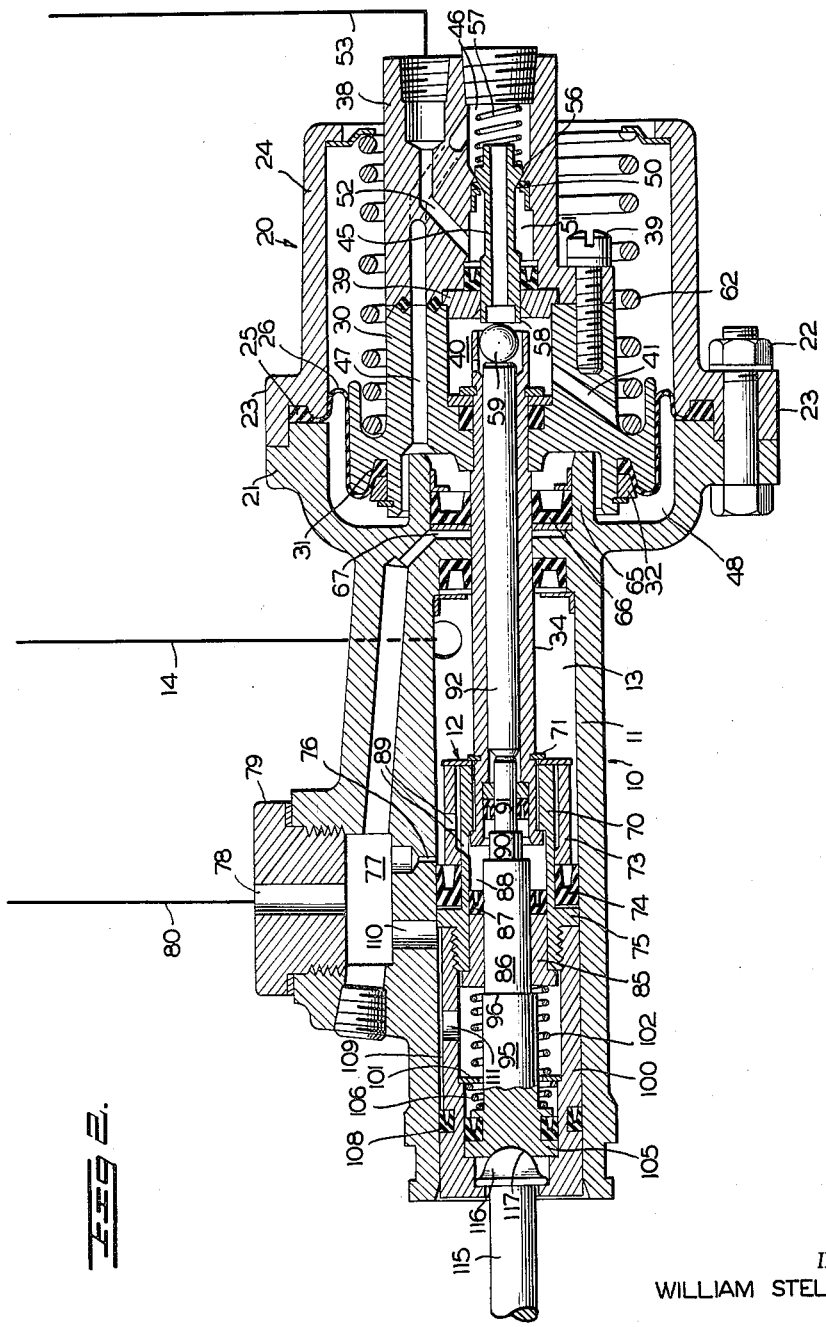

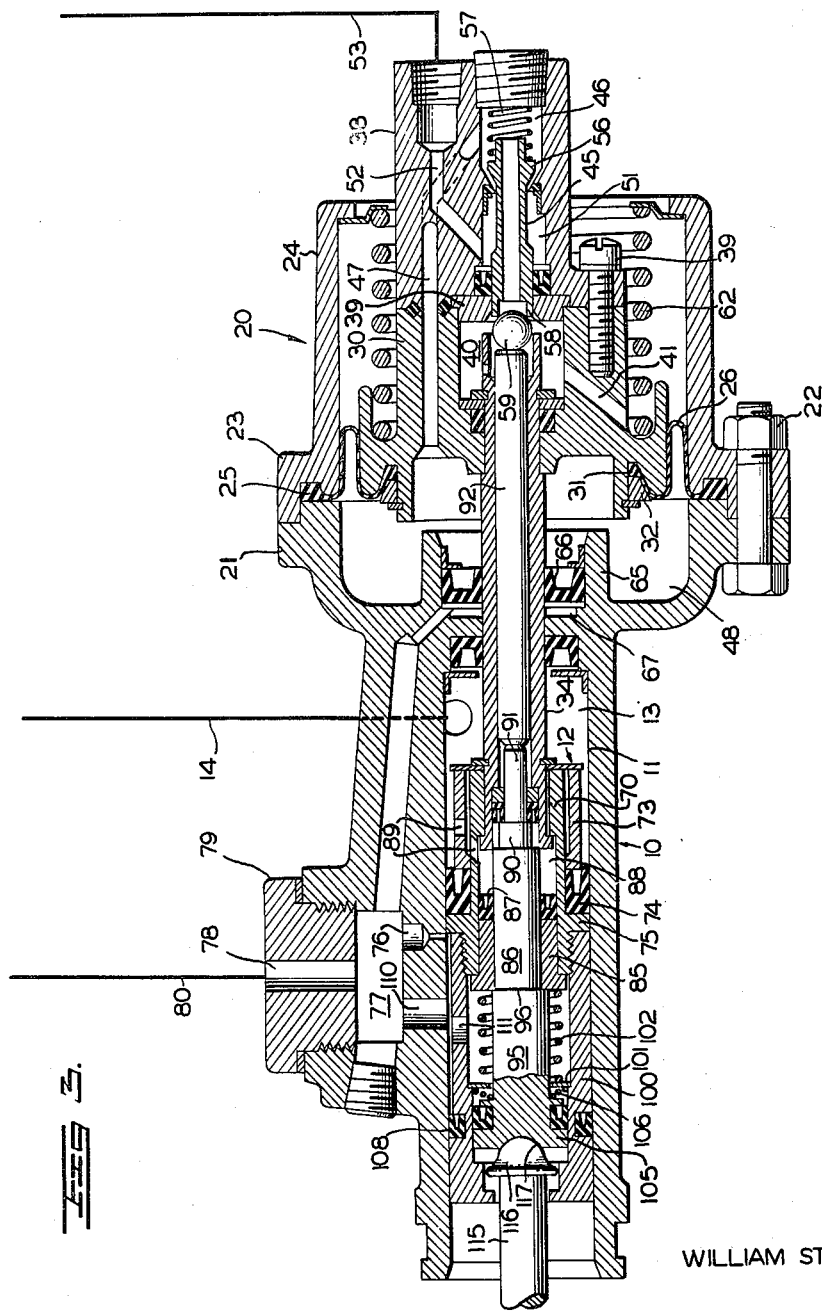

United States Patent Office 2,929,216
Patented Mar. 22, 1960

2,929,216

BOOSTER BRAKE MECHANISM

William Stelzer, Bloomfield Hills, Mich., assignor to Kelsey-Hayes Company, Detroit, Mich., a corporation of Delaware Application November 27, 1957, Serial No. 699,265

12 Claims. (Cl. 60—54.6)

This invention relates to a booster brake mechanism and contemplates the provision of an improvement over my co-pending application Serial No. 696,535, filed November 14, 1957.

In my copending application referred to I have disclosed a booster brake mechanism of the direct actuation type, that is, the type wherein a pedal operable rod transmits direct force to the valve mechanism of a booster motor to effect actuation thereof and transmits direct forces to the fluid displacing unit of the master cylinder. The structure of the copending application provides for the highly desirable "soft" pedal during initial stages of booster operation, followed by the application to the pedal of direct hydraulic reaction proportionate to hydraulic pressures in the master cylinder. Such reaction pressures are generated in the master cylinder upon initial contact of the brake shoes with the drums, and thus throughout the actual application of the brake shoes against the drums, the operator feels a reaction which is in direct proportion to the degree of brake application.

The present invention includes all of the advantageous features of the structure of the copending application referred to and has for its principal object the provision of means which operates during initial stages of booster brake operation to transmit light reaction to the brake pedal prior to initial engagement of the brake shoes with the drums, which initial reaction is directly proportional to pressures in the master cylinder and varies according to such pressures, instead of providing the means in the copending application referred to of resisting initial brake pedal operation through the medium of a biasing spring.

More specifically, an object of the invention is to provide pedal operable means in the form of a valve actuating member having areas open always to pressure in the master cylinder to be subject to such pressures no matter how slight they may be, thus providing means for reacting against the brake pedal during initial brake pedal operation, and to provide means for utilizing increased pressures in the master cylinder incident to brake shoe engagement for transmitting higher direct reaction prssures to the brake pedal, thus providing for two stages of hydraulic reaction.

A further object is to provide such an apparatus wherein the valve operating member has its pressure sensitive areas referred to exposed to a chamber within the master cylinder piston, which chamber is always open to pressure in the master cylinder whereby any slight increases in pressure therein occurring during initial motor operation will be reflected in increased, but relatively light, reactions against the brake pedal.

A further object is to provide an apparatus of the character just referred to wherein a pressure responsive member has one end subject to pressure in the chamber mentioned and is normally maintained inoperative through the functioning of a transition spring, which spring is overcome upon predetermined increases in pressure in the master cylinder so the secondary reaction member becomes operative for transmitting directly to the valve operating means a higher reaction which is always proportional to the degree of brake application.

Other objects and advantages of the invention will become apparent during the course of the following description.

In the drawings I have shown one embodiment of the invention. In this showing:

Figure 1 is a side elevation of the apparatus, certain parts being diagrammatically represented;

Figure 2 is an enlarged axial sectional view through the booster unit with the parts shown in normal off positions; and Figure 3 is a similar view with the parts illustrated in operative positions.

Referring to the drawings, the numeral 10 designates a body, preferably in the form of a casting, having a bore 11 therein as shown in Figures 2 and 3, in which is slidable a fluid displacing plunger indicated as a whole by the numeral 12 and described in detail below. The plunger 12 forms with one end of the bore 11 a master cylinder chamber 13 connected through suitable lines 14 to the wheel cylinders 15. Fluid displaced from the chamber 13 preferably passes through the usual residual pressure valve diagrammatically shown in Figure 1 and indicated by the numeral 16. It will be apparent that the residual pressure valve conveniently may be formed in the body 10.

The plunger 12 is operated by activating a motor indicated as a whole by the numeral 20. This motor is shown in the present instance as being of the super-atmospheric pressure type. The body 10 is provided at one end with a flange 21 to which is bolted as at 22 a flange 23 preferably formed integral with a casting 24 forming the body of the motor. Between the flanges 21 and 23 is secured a peripheral bead 25 on a diaphragm 26 constituting a part of the pressure responsive unit of the motor.

The pressure responsive unit of the motor further comprises a preferably cast body 30 to which is secured the inner bead 31 of the diaphragm 26, such bead being retained in position by a suitable retaining ring 32. One end of a power transmitting element in the form of a tube 34 extends axially through one end of the body 30 and is sealed and fixed with respect to the latter by any suitable means, for example as shown in Figures 2 and 3. The left-hand end of the tubular member 34 is fixed with respect to the plunger 12 in a manner to be described.

A preferably cast cap member 38 is fixed as at 39 to the body 30, and between the members 30 and 38 is fixed a disk 39 forming a closure for one end of a chamber 40 in the body 30. The adjacent end of the tubular member 34 extends into the chamber 40 as shown in Figures 2 and 3. The chamber 40 communicates through a passage 41 with the interior of the body 24, and such body is open to the atmosphere at its right-hand end as shown. Thus the chamber 40 is always open to the atmosphere.

A tubular valve member 45 is slidable through the disk or wall 39. The valve body 45 has its bore opening at one end into the atmospheric chamber 40 and its other end opening into a chamber 46 in the cap member 38. The chamber 46 communicates with a suitable passage 47 extending through the body 30 and cap member 38, the other end of the passage 47 communicating with a chamber 48 formed in the adjacent end of the body 10 and constituting the pressure chamber of the motor.

The chamber 46 is separated by a valve seat 50 from a high pressure chamber 51 formed in the cap member 38. The high pressure chamber communicates through a passage 52 in the cap member 38 with one end of a line 53 leading to a source of super-atmospheric pressure. Inasmuch as the source of pressure is connected directly to the pressure responsive unit of the motor, it will be obvious that the line 53 must be a flexible hose.

The tubular valve member 45 is provided with a poppet valve 56 normally engaging the valve seat 50 to disconnect the chambers 46 and 51 from each other. The poppet valve 56 is biased to its seat by a spring 57. The left-hand end of the tubular valve member 45, as viewed in Figures 2 and 3, forms a valve seat 58 engageable with, but normally disengaged from, a ball valve 59 arranged in the adjacent open end of the tubular member 34. The valve 59 being normally open, it will be obvious that the atmospheric chamber 40 normally communicates with the motor chamber 48 through the valve member 45, chamber 46 and passage 47. Thus pressures are normally balanced on opposite sides of the pressure responsive unit of the motor, and such unit is biased to its normal position by a spring 62.

Projecting axially into the motor chamber 48, the body 10 is provided with an annular flange 65 against which the body 10 is engaged to limit such body to its off position shown in Figure 2. The space within the flange 65 receives a seal 66 having a space 67 therebehind for a purpose to be described.

The fluid displacing plunger 12 comprises a body 70 into which the adjacent end of the tubular member 34 projects, such member being provided at its extremity with a flange engaging the body 70 to fix it against movement in one direction relative to the body 70, movement in the other direction being prevented by a snap ring 71 carried by the tubular member 34, and engaging a washer 12 directly contacting with the body 70. Accordingly, it will be apparent that the body 70 of the plunger 12 is fixed with respect to the pressure responsive unit of the motor to move therewith. The body 70 is surrounded adjacent one end by a sleeve 73 serving to maintain in position a seal 74 backed up against a flange 75 carried by the body 70. The sleeve 73 is of smaller diameter than the bore 11 and the chamber 13 is supplied with fluid through a conventional replenishing port 76 arranged at one end of the seal 74 to be closed thereby immediately upon movement of the plunger 12 to the right of its position shown in Figure 2. The replenishing port 76 communicates with a chamber 77, which in turn communicates through a port 78 in a threaded cap 79. The port 78 communicates with a line 80 (Figure 1) leading to a suitable reservoir 81 which, of course, can be embodied with the casting 10 as a part thereof.

A pressure responsive secondary reaction member 85 is slidable in the left-hand end of the body 70 as viewed in Figures 2 and 3 and engages such end of the body 70 to limit its forward movement. A valve operating member in the form of a rod 86 is slidable through the reaction member 85 and these two members and the body 70 are sealed with respect to each other as at 87 to prevent leakage from an internal chamber 88 in the body 70. This chamber is in constant communication with the hydraulic chamber 13 through ports 89 formed in the members 70 and 73. The rod 86 is provided with reduced portions 90 and 91 forming shoulders facing to the right in Figures 2 and 3 to be subject to pressure in the chamber 88, as further described below. The rod portion 91 is in engagement with the adjacent end of a valve operating rod 92, the other end of which engages the ball valve 59 to seat the latter upon operation of the rod 86. The rod 86 is provided with an enlarged portion 95 having at one end a shoulder 96 normally spaced from the adjacent end of the reaction member 85.

An elongated sleeve 100 forms a part of the plunger 12 and is threaded to the body 70. A spring seat 101 within the sleeve 100 is engaged by one end of a spring 102, the other end of which engages the reaction member 85 to tend to hold it in the normal position shown in Figure 2. The spring 102 is a transition spring and determines the pressure in the chamber 13 at which the reaction member 85 will move to the left of its position in Figure 2 to engage the shoulder 96.

The left-hand end of the rod 86 is provided with a head 105 sealed in the adjacent end of the sleeve 100, and a biasing spring 106 is arranged between the head 105 and spring seat 101 to bias the rod 86 to the normal position shown in Figure 2. The sleeve 100 is sealed as at 108 in the adjacent end of the bore 11, and from such seal to the flange 75, the sleeve 100 is grooved as at 109 for communication with a port 110 opening into the chamber 77. The groove 109 communicates with the interior of the sleeve 100 through a port 111. Thus hydraulic fluid is maintained within the bore 11 adjacent the left-hand end thereof and within the sleeve 100 for the purpose of lubricating the seals.

A push rod 115 is provided with a hemispherical head 116 engaging in a similar recess 117 formed in the adjacent end of the rod 86. The rod 115 is pivotally connected as at 118 to a pedal lever 119, shown in the present instance as being of the depending type, pivotally supported at its upper end as at 120 and having a pedal pad 121 at its lower end.

*Operation*

The parts normally occupy the positions shown in Figure 2, the motor chamber 48 communicating with the atmosphere through passage 47, chamber 46, the interior of the valve member 45, chamber 40 and passage 41. The rod 86 is at its left-hand limit of movement, and the left-hand end of the reaction member 85 is seated in its normal position by the spring 102, spaced from the shoulder 96. Operation of the brakes is effected by pushing the pedal pad 121 to move the rod 115 toward the right of the position shown in Figure 2. Direct axial movement will be transmitted through the rods 86 and 92 to the valve 59 to engage it against the seat 58, thus disconnecting the chambers 40 and 46 from each other. Slight additional pedal movement will cause the ball 59 to move the tubular valve member to the right of the position shown in Figure 2 to unseat the poppet valve 56. Super-atmospheric pressure from the line 53 will then flow through the port 52 into the chamber 51, thence around valve 56 into the chamber 46 and through passage 47 into the motor chamber 48. The pressure responsive unit thus will start to move toward the right, and such movement will be transmitted through the tubular member 34 to the plunger 12, the latter moving in a follow-up action relative to the rod 86 to displace fluid from the chamber 13 through lines 14 into the wheel cylinders 15.

Such initial movement of the plunger 12 generates some pressure in the chamber 13 prior to engagement of the brake shoes with the drums. Pressure in the chamber 13 will be communicated to the chamber 88 and will act against the areas of the right-hand facing shoulders at opposite ends of the rod portion 90, thus opposing pedal operation of the rod 86 and providing the first stage of reaction which will be felt by the operator in depressing the brake pedal. This pressure is the only resistance encountered to pedal operation except for the light springs 106 and 57, and, generally speaking, resistance to movement of the brake pedal will be proportional to initial pressures generated in the chamber 13.

The pressure referred to in the chamber 88 will act to the left against the seal 87 and in the same direction against the reaction member 85. The transition spring 102, at this time, is sufficient to overcome pressure in the chamber 88, and accordingly the reaction member 85 will move as a unit with the plunger 12.

As soon as the brake shoes engage the brake drums, there will be a substantial increase in pressure in the chamber 13 up to, for example, from 40 to 80 p.s.i.

This pressure will be duplicated in the chamber 88, and when it becomes sufficient for such purpose, the spring 102 will be overcome and the reaction member 85 will move to the left into engagement with the shoulder 96. Thus the same pressure which is present in the chamber 13 will react against the area of the reaction member 85 exposed to pressure in the chamber 88 to provide a second stage of pedal reaction. This reaction, of course, is substantially greater than the reaction provided in the initial stage of operation as referred to above, and will be proportional to pressures in the chamber 13, thus providing the brake pedal with the proper "feel." In order to maintain and continue brake pedal operation, of course, the operator must balance or overcome pressure in the chamber 88, and accordingly the operator performs part of the work in applying the brakes.

Obviously, a follow-up action of the pressure responsive unit of the motor takes place relative to the pedal. If a partial brake application is made and pedal movement is arrested, a slight additional movement of the pressure responsive unit will move the valve seat 50 into engagement with the poppet valve 56 to restore the lap position of the valves. Any tendency for the pressure responsive unit to overrun the position corresponding to the position of the brake pedal will result in the transmitting of movement from the valve seat 50 to the poppet valve 56, thus slightly moving the tubular valve body 45 to crack the valve 59 and release pressure from the motor.

When the brake pedal is released, pressure against the ball valve 59 will be immediately relieved and the spring 57 will seat the poppet valve 56, thus restoring communication between the motor chamber 48 and the atmosphere. The return spring 62 will then return the pressure responsive unit of the motor and the fluid displacing plunger 12 to their normal off positions. Pressure will be immediately relieved in the chamber 13, whereupon the spring 102 will return the reaction member 85 to the normal position in Figure 2. The spring 106 will return the valve operating rod 86 and push rod 115 to their normal positions.

From the foregoing, it will be apparent that the present construction provides all of the operational and structural advantages of the apparatus shown in my copending application referred to, all forces being applied and transmitted coaxially through the apparatus. Additionally, the present construction does not depend merely upon springs to slightly oppose initial movement of the brake pedal to provide a "soft" pedal, but on the contrary, applies directly against the valve operating rod 86 all hydraulic pressures which may be present in the chamber 13. The shoulders of the brake operating rod subject to such pressures provide light and proportional hydraulic pressures during initial motor operation, while the reaction member 85 provides a secondary stage of direct hydraulic reaction which will be heavier than in the initial stage, but still proportionate to the hydraulic pressures being applied to the brakes. These reaction forces, as is true of all forces as stated above, are applied axially of the apparatus and there is no tendency for any of the parts to bind during any operational stages.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake mechanism comprising a hydraulic chamber having an outlet for connection with the wheel cylinders of a motor vehicle, a fluid displacing unit in said chamber movable to displace hydraulic fluid therefrom, a fluid pressure motor having a pressure chamber and a pressure responsive unit movable by pressure in such chamber and connected to said fluid displacing unit, a valve mechanism connected between said pressure chamber and sources of different pressures, means comprising a valve operating rod projecting axially into said fluid displacing unit and connected to said valve mechanism, said rod having a surface exposed to pressure in said hydraulic chamber to oppose valve operating movement of said rod in accordance with pressures in said hydraulic chamber, and reaction means exposed to pressure in said hydraulic chamber and engageable with said rod when pressures in said hydraulic chamber increase to a predetermined point to oppose valve operating movement of said rod.

2. A mechanism according to claim 1 wherein said reaction means is carried by said fluid displacing unit and is biased for movement toward said hydraulic chamber to a normal off position engaging said fluid displacing unit, said reaction means having lost motion connection with said rod, which lost motion connection is taken up when pressure in said hydraulic chamber increases to a predetermined point.

3. A mechanism according to claim 1 wherein said fluid displacing unit has a bore communicating with said hydraulic cylinder, said reaction means comprising a sleeve having one end exposed to said bore, and means biasing said sleeve toward said hydraulic chamber to a normal position engaging said fluid displacing unit, said sleeve having lost motion connection with said rod, which lost motion connection is taken up to engage said sleeve with said rod when pressure in said hydraulic cylinder increases to a predetermined point.

4. A mechanism according to claim 1 wherein said fluid displacing unit has a bore one end of which forms a reaction chamber communicating with said hydraulic cylinder, said reaction means comprising a sleeve slidable in the other end of said bore and having one end exposed to said reaction chamber, said rod being slidable in said sleeve, and means biasing said sleeve toward said hydraulic chamber to a normal position engaging said fluid displacing unit, said sleeve having lost motion connection with said rod, which lost motion connection is taken up to engage said sleeve with said rod when pressure in said hydraulic cylinder increases to such a point that it overcomes said biasing means.

5. A booster brake mechanism comprising a hydraulic chamber having an outlet for connection with the wheel cylinders of a motor vehicle, a fluid displacing unit in said chamber movable to displace hydraulic fluid therefrom, a fluid pressure motor coaxial with said chamber and having a pressure chamber and a pressure responsive unit movable by pressure in such chamber, a tubular power transmitting member connected at one end to said pressure responsive unit and at its other end to said fluid displacing unit, a valve mechanism carried by said pressure responsive unit and connected between said pressure chamber and sources of different pressures, means projecting through said tubular member and connected to said valve mechanism to operate it, such means comprising a rod coaxial with said pressure responsive unit and having surfaces exposed to pressure in said hydraulic chamber to oppose valve operating movements of said rod in accordance with pressures in said hydraulic chamber, and reaction means exposed to pressure in said hydraulic chamber and engageable with said rod when pressures in said hydraulic chamber increase to a predetermined point to oppose valve operating movement of said rod.

6. A mechanism according to claim 5 wherein said reaction means comprises a member carried by said fluid displacing unit, and means biasing said member for movement toward said hydraulic chamber to a normal off position engaging said fluid displacing unit, said member having lost motion connection with said rod whereby, when pressure in said hydraulic chamber increases to a predetermined point, said biasing means will be overcome and said lost motion connection will be taken up and said member will transmit reaction to said rod opposing movement thereof.

7. A mechanism according to claim 5 wherein said fluid displacing unit has a reaction chamber communicating with said hydraulic chamber, said reaction means comprising a member slidably carried by said fluid displacing unit and having one end exposed to said reaction chamber, and means biasing said member toward said hydraulic chamber to a normal position engaging said fluid displacing unit, said member having lost motion connection with said rod whereby, when pressure in said hydraulic chamber increases to a predetermined point, said biasing means will be overcome and said lost motion connection will be taken up and said member will transmit reaction forces to said rod to oppose movement thereof.

8. A mechanism according to claim 5 wherein said fluid displacing unit has an axial bore one end of which forms a reaction chamber communicating with said hydraulic chamber, said reaction means comprising a sleeve slidable in the other end of said bore and having one end exposed to said reaction chamber, said rod being slidable in said sleeve, and means biasing said sleeve toward said hydraulic chamber to a normal position engaging said fluid displacing unit, said sleeve having lost motion connection with said rod whereby, upon a predetermined increase in pressure in said reaction chamber, said lost motion connection will be taken up and said member will transmit reaction forces to said rod opposing movement thereof.

9. A booster brake mechanism comprising a hydraulic chamber having an outlet for connection with the wheel cylinders of a motor vehicle, a fluid displacing unit in said chamber movable to displace fluid therefrom, a fluid pressure motor coaxial with said chamber and having a pressure chamber and a pressure responsive unit movable by pressure in such chamber, a tubular member connected at opposite ends to said pressure responsive unit and said fluid displacing unit to transmit movement from the former to the latter, a valve mechanism carried by said pressure responsive unit and connected between said pressure chamber and sources of different pressures, valve operating means projecting axially through said fluid displacing unit and through said tubular member and into said pressure responsive unit and engageable with said valve mechanism, said fluid displacing unit having a reaction chamber therein communicating with said hydraulic chamber, said valve operating means comprising a rod having a shoulder facing toward said hydraulic chamber and exposed to pressures in said reaction chamber whereby movement of said rod will be opposed by pressures in said hydraulic chamber, and reaction means exposed to pressure in said reaction chamber and engageable with said rod when pressures in said reaction chamber increase to a predetermined point to oppose valve operating movement of said rod.

10. A mechanism according to claim 9 wherein said reaction means is carried by and slidable with respect to said fluid displacing unit, said reaction means having a normal off position engaging said fluid displacing unit, said rod and said reaction means having portions in axially spaced relation when said reaction means is in said normal off position, and a transition spring fixed at one end with respect to said fluid displacing unit and having its other end engaging said reaction means to bias the latter to said off position whereby, when pressure in said reaction chamber overcomes said transition spring, said portions of said reaction means and said rod will be engaged and said reaction means will oppose valve operating movement of said rod.

11. A mechanism according to claim 10 wherein said fluid displacing unit is provided with an axial bore, one end of which forms said reaction chamber, said reaction means comprising a member slidable in the other end of said bore.

12. A mechanism according to claim 10 wherein said fluid displacing unit is provided with an axial bore, one end of which forms said reaction chamber, said reaction means comprising a sleeve slidable in the other end of said bore, said rod being axially slidable in said sleeve.

References Cited in the file of this patent

UNITED STATES PATENTS

| | | |
|---|---|---|
| 2,548,496 | Rockwell | Apr. 10, 1951 |
| 2,685,171 | Price | Aug. 3, 1954 |